(12) United States Patent
Cayre et al.

(10) Patent No.: US 8,291,709 B2
(45) Date of Patent: Oct. 23, 2012

(54) COMBUSTION CHAMBER OF A TURBOMACHINE INCLUDING COOLING GROOVES

(75) Inventors: Alain Cayre, Pamfou (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 1063 days.

(21) Appl. No.: 12/237,658

(22) Filed: Sep. 25, 2008

(65) Prior Publication Data

US 2009/0077977 A1 Mar. 26, 2009

(30) Foreign Application Priority Data

Sep. 26, 2007 (FR) ...................................... 07 06725

(51) Int. Cl.
*F02C 1/00* (2006.01)

(52) U.S. Cl. ........................................... 60/755; 60/752

(58) Field of Classification Search ............. 60/752–760, 60/805, 804, 800, 806
See application file for complete search history.

(56) References Cited

U.S. PATENT DOCUMENTS

| | | | |
|---|---|---|---|
| 3,959,966 A * | 6/1976 | Pearce et al. ..................... | 60/796 |
| 4,380,906 A | 4/1983 | Dierberger | |
| 4,566,280 A * | 1/1986 | Burr ................................ | 60/757 |
| 4,655,044 A * | 4/1987 | Dierberger et al. ............. | 60/753 |
| 4,723,413 A * | 2/1988 | Simon et al. ..................... | 60/757 |
| 4,821,522 A | 4/1989 | Matthews et al. | |
| 5,123,248 A * | 6/1992 | Monty et al. ..................... | 60/740 |
| 5,289,677 A | 3/1994 | Jarrell | |
| 5,417,545 A * | 5/1995 | Harrogate ..................... | 415/115 |
| 6,250,082 B1 * | 6/2001 | Hagle et al. ..................... | 60/753 |
| 6,640,547 B2 * | 11/2003 | Leahy, Jr. ........................ | 60/752 |
| 6,675,582 B2 * | 1/2004 | Monty et al. ..................... | 60/752 |
| 2004/0045298 A1 * | 3/2004 | Pidcock et al. ................. | 60/752 |
| 2005/0050896 A1 * | 3/2005 | McMasters ..................... | 60/748 |
| 2005/0086940 A1 * | 4/2005 | Coughlan et al. .............. | 60/752 |
| 2010/0071382 A1 * | 3/2010 | Liang .............................. | 60/806 |

FOREIGN PATENT DOCUMENTS

| | | |
|---|---|---|
| EP | 1 092 925 A1 | 4/2001 |
| EP | 1 445 537 A2 | 8/2004 |
| GB | 2 212 607 A | 7/1989 |
| RU | 2 039 323 C1 | 7/1995 |

* cited by examiner

*Primary Examiner* — Ehud Gartenberg
*Assistant Examiner* — Gerald Sung
(74) *Attorney, Agent, or Firm* — Oblon, Spivak, McClelland, Maier & Neustadt, L.L.P.

(57) ABSTRACT

An annular combustion chamber of a turbomachine is disclosed. The combustion chamber includes two walls of revolution each having an annular groove extending around the longitudinal axis of the chamber and opening out inside the chamber. The groove has in cross section a substantially U or V shape that is splayed towards the downstream end and has lateral annular surfaces that are inclined with respect to the area of the wall at which the groove is situated.

14 Claims, 3 Drawing Sheets

COMBUSTION CHAMBER OF A TURBOMACHINE INCLUDING COOLING GROOVES

BACKGROUND OF THE INVENTION

FIELD OF THE INVENTION

The present invention concerns an annular combustion chamber of a turbomachine such as an aircraft turbojet engine or turboprop engine.

DESCRIPTION OF THE RELATED ART

A combustion chamber of this type comprises coaxial walls of revolution that extend one inside the other and are connected at their upstream ends by an annular chamber bottom wall comprising openings for mounting fuel injectors.

In operation, part of the air flow supplied by a compressor supplying the chamber passes through the openings in the chamber bottom wall and is mixed with the fuel brought by the injectors, this air/fuel mixture then being burnt inside the chamber. Another part of this air flow passes round the combustion chamber and then enters the chamber through multiperforations formed in the internal and external walls of the chamber in order to cool these walls. The air flow cooling the chamber in this case represents approximately 25% to 30% of the air flow supplying the chamber.

The circulation of air through the multiperforations in the chamber provides even cooling of the chamber and makes it possible to have a relatively low temperature gradient in the radial direction in the combustion jet. However, this technology is not entirely satisfactory since the temperature at the internal periphery and at the external periphery of the jet remains relatively high, which may cause the appearance of cracks and fissures on the walls of the chamber.

Moreover, the walls of the chamber are connected at their downstream ends to annular flanges for fixing to internal and external casings of the chamber. These flanges in operation have high temperature gradients in the radial direction.

In addition, a turbine inlet distributor is mounted at the outlet of the combustion chamber and comprises coaxial cylinders between which substantially radial blades extend. The cylinders of the distributor are axially in line with the walls of the chamber and cooperate sealingly with their fixing flanges. The cylinders of the distributor are also exposed to the high temperatures that prevail at the internal and external peripheries of the combustion jet. It is therefore in general necessary to provide multiperforations for the passage of cooling air over these cylinders.

One solution to all these problems would consist of increasing the proportion of the air flow (for example up to 35%-45%) allocated to the cooling of the chamber. However, this solution is also not satisfactory since it causes a very high temperature gradient in the radial direction in the jet and extreme temperatures at the heart of the combustion centre.

BRIEF SUMMARY OF THE INVENTION

The aim of the invention is in particular to afford a simple, effective and economical solution to these problems.

For this purpose it proposes an annular combustion chamber of a turbomachine, comprising two coaxial walls of revolution extending one inside the other and delimiting the chamber between them, each of these walls comprising at least one annular groove extending around the longitudinal axis of the chamber and opening out inside the chamber, this groove being supplied with cooling air through orifices formed in the wall and opening out at one of their ends in the groove and at the other end outside the chamber, wherein the groove has in cross section a substantially U or V shape that is splayed towards the downstream end and comprises two lateral annular surfaces inclined with respect to the area of the wall at which the groove is situated.

In general terms, the invention makes it possible to form a turbulent film of cooling air intended to flow along the internal and external walls of the chamber, and possibly of the cylinders of the distributor situated downstream.

The inclination of the lateral surfaces of the groove with respect to the wall of the chamber enables the cooling air to penetrate to a greater depth in the chamber and therefore to cool an annular layer of relatively great thickness of the combustion jet. The depth of penetration of the cooling air and the feed rate of air to the groove must be sufficient to cool the internal and external peripheries of the jet without however interfering with the combustion of the gases in the chamber. The invention is particularly adapted, but not exclusively, to a chamber comprising multiperforations in order to be able to cool the internal and external peripheries of the jet without however increasing the cooling air flow for the chamber.

The groove according to the invention has in cross section a U or V shape that is splayed towards the downstream end in order to reduce the speed of flow of the air in the groove and chamber. The combination of the inclination of the groove and the shape of this groove splayed or broadened towards the downstream end makes it possible to better control the depth of penetration of the cooling air in the combustion jet.

By way of example, the angle formed between each lateral surface of the groove and the area of the wall where the groove is situated is between approximately 5° and 35°. The lateral surfaces of the groove diverge for example from each other towards the downstream end by an angle of between approximately 2° and 10°. The downstream end of the groove can for example be wider than the base of the groove by approximately 1 to 2 mm.

In a variant, the lateral surfaces of the groove are parallel to each other.

According to another feature of the invention, the groove is formed at the downstream end of each wall of the chamber, close to an annular flange for fixing this wall to a casing of the chamber.

A film of air is thus formed in the vicinity of the downstream end of each wall of the chamber and affords many advantages in addition to the advantages already described above:

it makes it possible to cool the downstream end of the chamber wall;

it also participates in the cooling of the cylinder of the turbine distributor situated directly downstream. It is therefore possible to reduce the number of multiperforations on these cylinders, which are complex and expensive to produce;

part of the air leaving the groove also enters an annular space formed between the fixing flange and the cylinder of the distributor, which results in better ventilation of the flange and therefore an appreciable reduction in the temperature gradient in the radial direction of this flange.

Advantageously, the groove is supplied with air by an annular row of first orifices that extend substantially parallel to the area of the wall where the groove is situated. These first orifices are parallel to the wall of the chamber and are therefore inclined with respect to the lateral surfaces of the groove. These orifices open out for example in the bottom of the groove and the air that opens out from these orifices impacts on a lateral surface of the groove in order to improve the cooling of the chamber wall by thermal conduction.

The first orifices can also be slightly inclined with respect to the aforementioned area of the wall, for example by around 1° to 15° approximately.

The groove can also be supplied with air by an annular row of second orifices that are substantially perpendicular to the area of the wall where the groove is situated. These second orifices are also inclined with respect to the lateral surfaces of the groove and the air that opens out through these orifices impacts on one of these lateral surfaces in order to cool the chamber by conduction. The impact of the cooling air on the lateral surface of the groove also reduces the speed of penetration of the air in the chamber.

These second orifices can also be slightly inclined with respect to a normal to the aforementioned area of the wall, for example by around 1° to 20° approximately.

Preferentially, the first orifices are disposed so as to be staggered with the second orifices in order to provide even cooling of the downstream end of each wall and to form a film of air of constant thickness around the longitudinal axis of the chamber.

The chamber comprises for example between 100 and 500 orifices supplying air to the groove. These orifices have a diameter of between approximately 0.5 and 2 mm and make it possible to calibrate the air supply flow to the groove. This air flow represents approximately 1% to 2% of the air supply flow to the chamber.

The invention also concerns a turbomachine, such as an aircraft turbojet engine or turboprop engine, wherein it comprises a combustion chamber as described above.

In the case where a distributor is mounted directly downstream of the combustion chamber, the downstream end part of the external wall of the chamber where the groove is situated has a diameter that increases towards the downstream end and that is slightly less than the inside diameter of the external cylinder of the distributor situated downstream. In operation, these parts expand in the radial direction and the difference in diameter between the external wall of the chamber and the external cylinder of the distributor tends to disappear so that these parts are perfectly aligned in the axial direction.

BRIEF DESCRIPTION OF THE SEVERAL VIEWS OF THE DRAWINGS

The invention will be better understood and other features, details and advantages of the present invention will open out more clearly from a reading of the following description given by way of non-limitative example with reference to the accompanying drawings, in which.

DETAILED DESCRIPTION OF THE INVENTION

Figure 1:
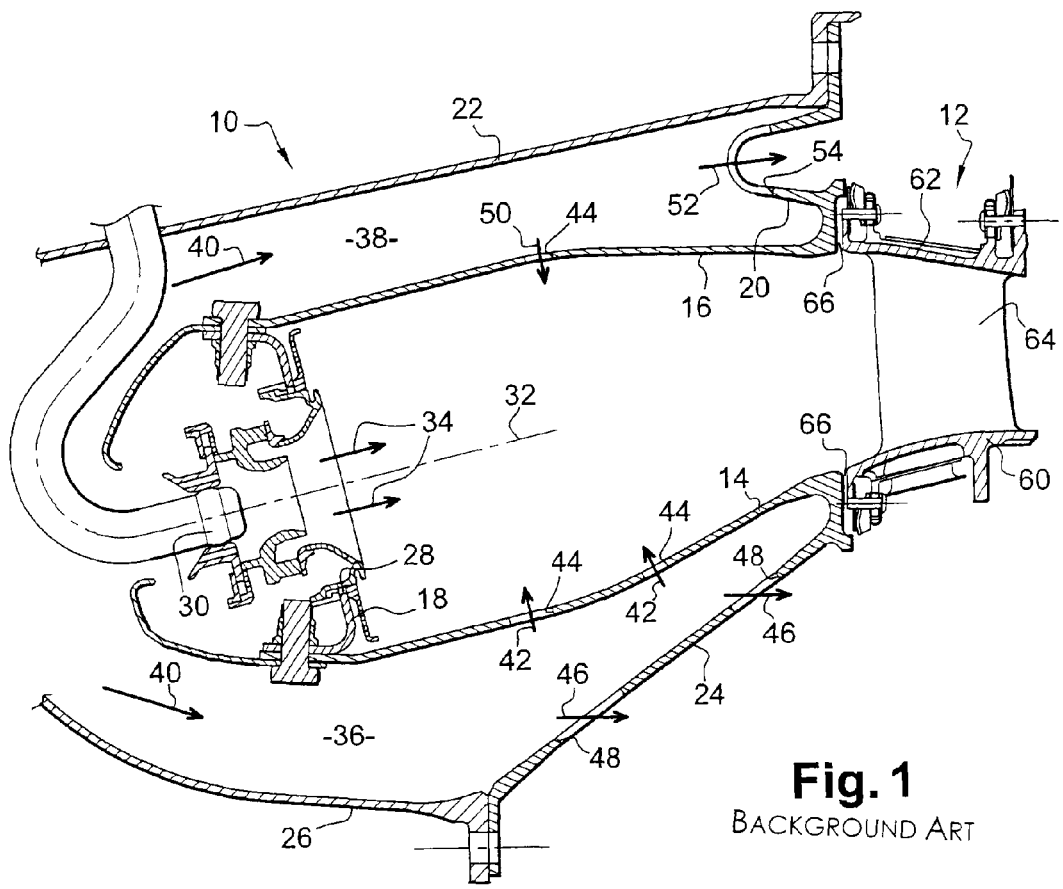
FIG. 1 is a schematic half-view in axial section of a turbomachine combustion chamber according to the prior art.

Reference is made first of all to FIG. 1, which depicts an annular combustion chamber 10 of a turbomachine, such as an aircraft jet engine or turboprop engine, which is arranged downstream of a compressor and diffuser (not shown), and upstream of an inlet distributor 12 of a high-pressure turbine.

The combustion chamber comprises internal 14 and external 16 walls of revolution that extend one inside the other and are connected upstream to an annular chamber bottom wall 18. The external wall 16 of the chamber is connected at its downstream end to an external annular flange 20 that is fixed at its external periphery to an external casing 22 of the chamber, and its internal wall 14 is connected at its downstream end to an internal annular flange 24 that is fixed at its internal periphery to an internal casing 26 of the chamber.

The annular wall 18 of the chamber bottom comprises openings 28 through which there pass air coming from the compressor and fuel brought by injectors (not shown) fixed to the external casing 22. Each injector comprises a fuel injection head 30 mounted in an opening 28 in the annular wall 18 and aligned on the axis 32 of this opening 28.

The distributor 12 is fixed downstream of the chamber by suitable means and comprises internal 60 and external 62 cylinders that extend one inside the other and are connected together by radial blades 64. The external cylinder 62 of the distributor is aligned axially with the downstream end part of the external wall 16 of the chamber, and its internal cylinder 60 is aligned axially with the downstream end part of the internal wall 14 of the chamber.

The cylinders 60, 62 of the distributor delimit, with the chamber fixing flanges 20, 24, two annular spaces 66, respectively internal and external, which open out at one of their ends inside the chamber and are closed at the other end by sealing means mounted between the cylinders 60, 62 and flanges 20, 24.

Part of the air flow supplied by the compressor situated upstream passes through the openings 28 and supplies the combustion chamber 10 (arrows 34), the other part of the air flow supplying internal 36 and external 38 annular spaces for passing round the chamber (arrows 40).

The internal space 36 is formed between the internal casing 26 and the internal wall 14 of the chamber, and the air that passes in this space divides into a flow 42 that enters the chamber 10 through orifices 44 and multiperforations (not shown) in the internal wall 14, and a flow 46 that passes through holes 48 in the internal flange 24 of the chamber in order to cool components, not shown, situated downstream of this chamber.

The external space 38 is formed between the external casing 22 and the external wall 16 of the chamber, and the air that passes in this space divides into a flow 50 that enters the chamber 10 through orifices 44 and multiperforations, not shown, in the external wall 16, and a flow 52 that passes through holes 54 in the external flange 20 in order to cool downstream components. The air that passes through the holes 48 and 54 in the flanges 20, 24 supplies for example multiperforations, not shown, formed in the cylinders 60, 62 of the distributor 12 in order to cool them.

The air flow 44, 50 for cooling the chamber, that is to say the air flow passing through the orifices 44 and the multiperforations in the walls 14, 16 of the chamber, represents approximately 25% to 30% of the air flow supplying the chamber. The orifices 44 and the multiperforations in the walls 14, 16 of the chamber are evenly distributed around the axis of the chamber.

Figure 2:
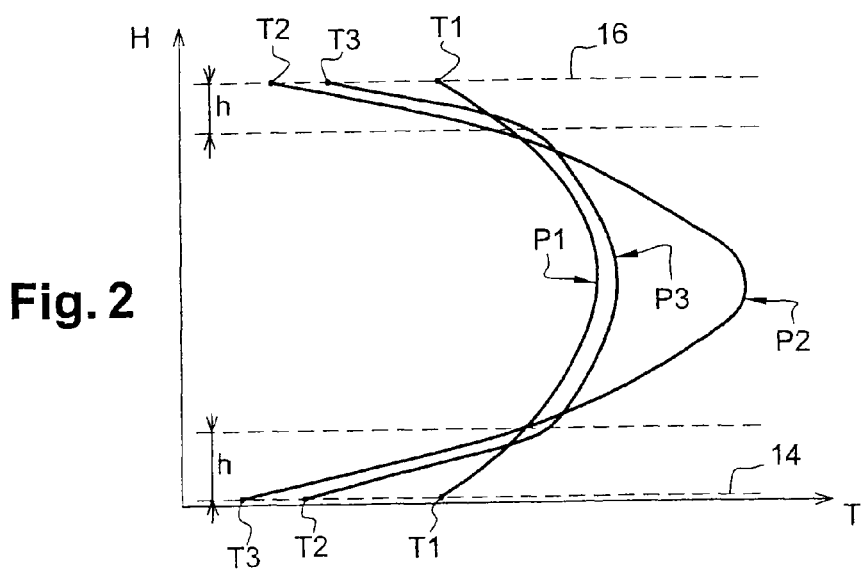
FIG. 2 is a graph depicting various temperature profiles in the jet of a combustion chamber.

In operation, the temperature profile P1 in the radial direction in the combustion jet is as shown in FIG. 2. The profile P1 has a roughly rounded shape, the convexity of which is oriented towards the downstream end. This profile Pi indicates that the temperature inside the jet varies relatively little in the radial direction between the internal periphery of the jet, situated at the internal wall 14, and the external periphery of the jet, situated at the external wall 16. This profile is characterised by a relatively flat front (the middle part of the curve), this front being connected at each of its ends to a relatively short tail that terminates at T1 in a relatively high temperature. The temperature of the combustion gases close to the walls 14, 16 of the chamber is thereby close to that of the actual heart of the combustion centre and is therefore very high, which results in many drawbacks described above.

One solution to this problem consists of increasing the chamber cooling air flow by 10% to 15%. In this case, the temperature in the combustion jet has a profile P2 that is characterised by a very pointed front and relatively long tails terminating at T2 in acceptable temperatures for the walls 14, 16 of the chamber. However, the temperature at the heart of the combustion body (the point of the front) is too high.

The invention affords an effective solution to this problem by injecting cooling air into the chamber in order to form air flow films at the internal periphery and the external periphery of the chamber. When the invention is combined with the multiperforations of the walls 14, 16 of the chamber, the temperature prevailing inside the jet has profile P3 that presents substantially the front of the profile P1 and the tails of the profile P2, and therefore terminates in relatively low temperatures T3 at the internal and external peripheries of the jet.

The air is injected into the chamber at a speed, depth and angle of incidence that are determined so as to properly control the thickness of each film of air in the radial direction and therefore to properly control the change in the temperature of the combustion gases at the peripheries of the jet. In the example shown in FIG. 2, each film has a height h or radial dimension that represents approximately 10% to 15% of the total height H of the combustion jet.

Figure 3:
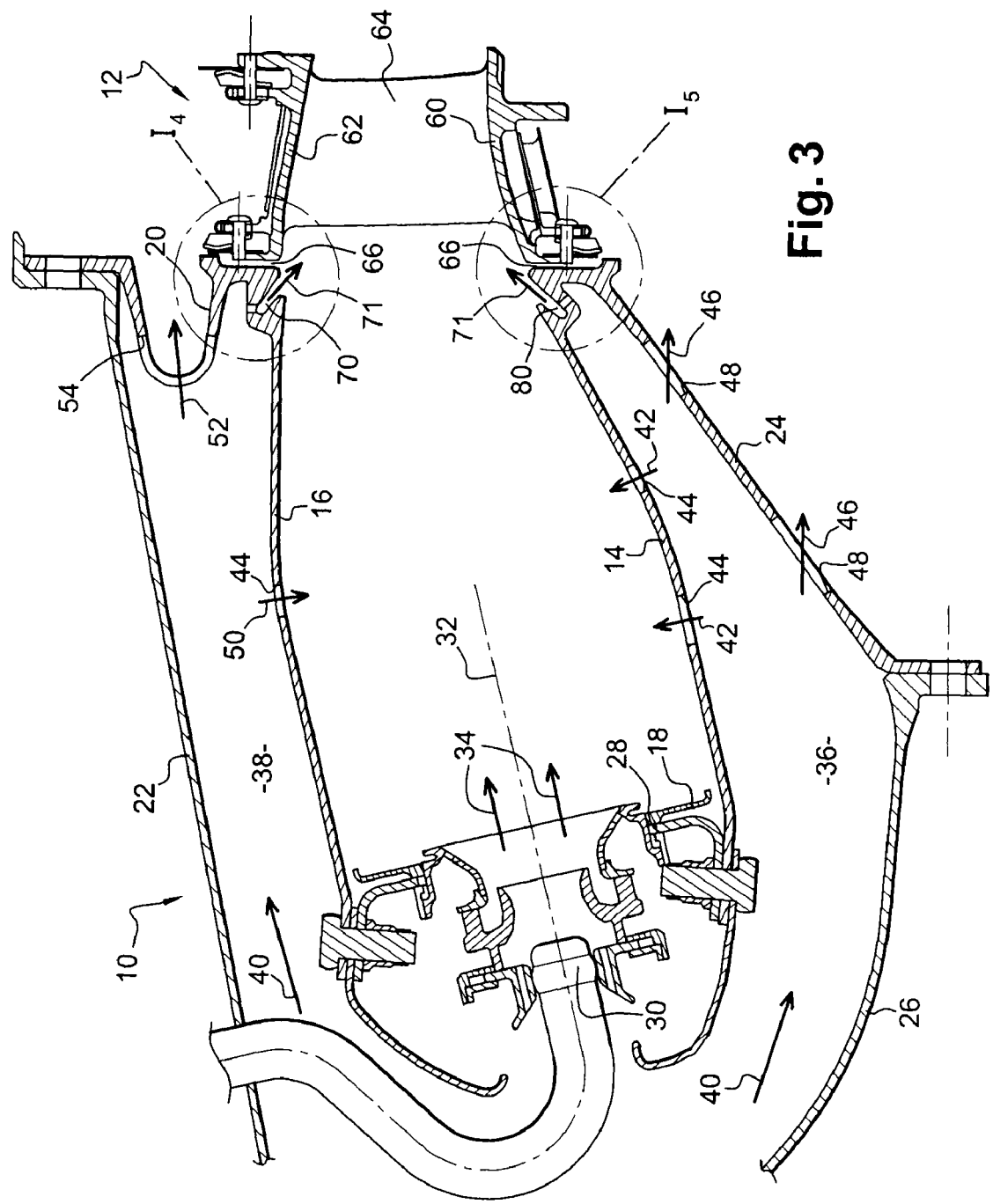
FIG. 3 is schematic half-view in axial section of a turbomachine combustion chamber according to the invention.
Figure 4:
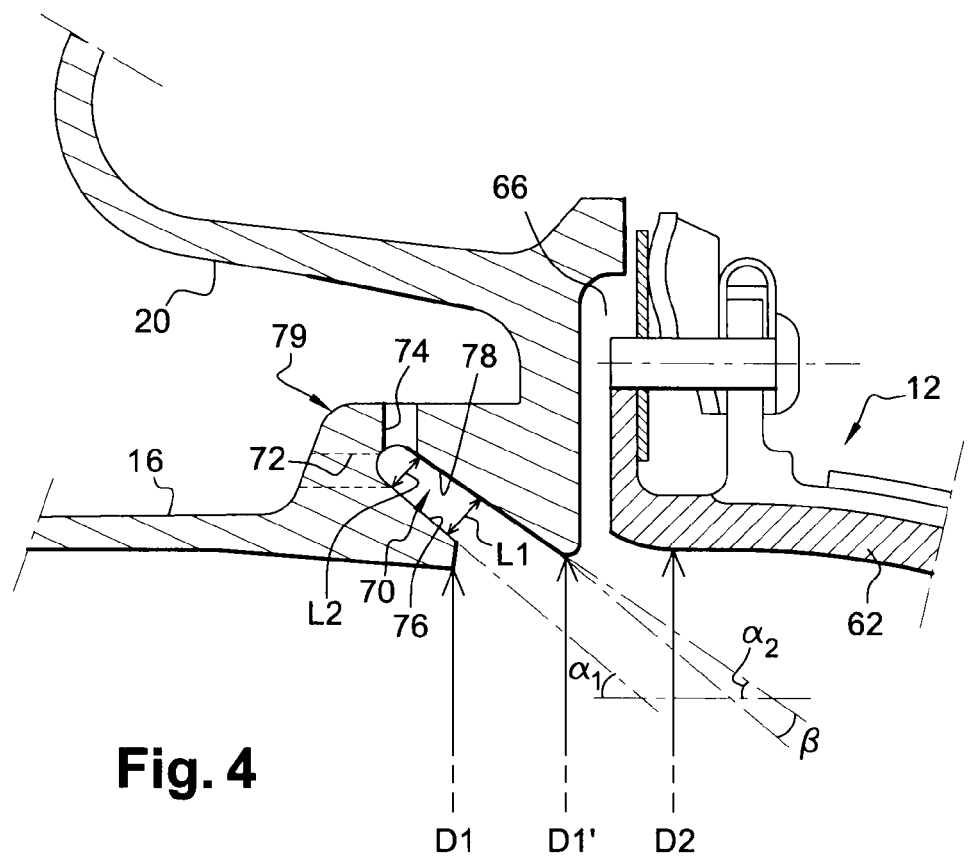
FIG. 4 is an enlarged view of the detail $I_4$ in FIG. 3.
Figure 5:
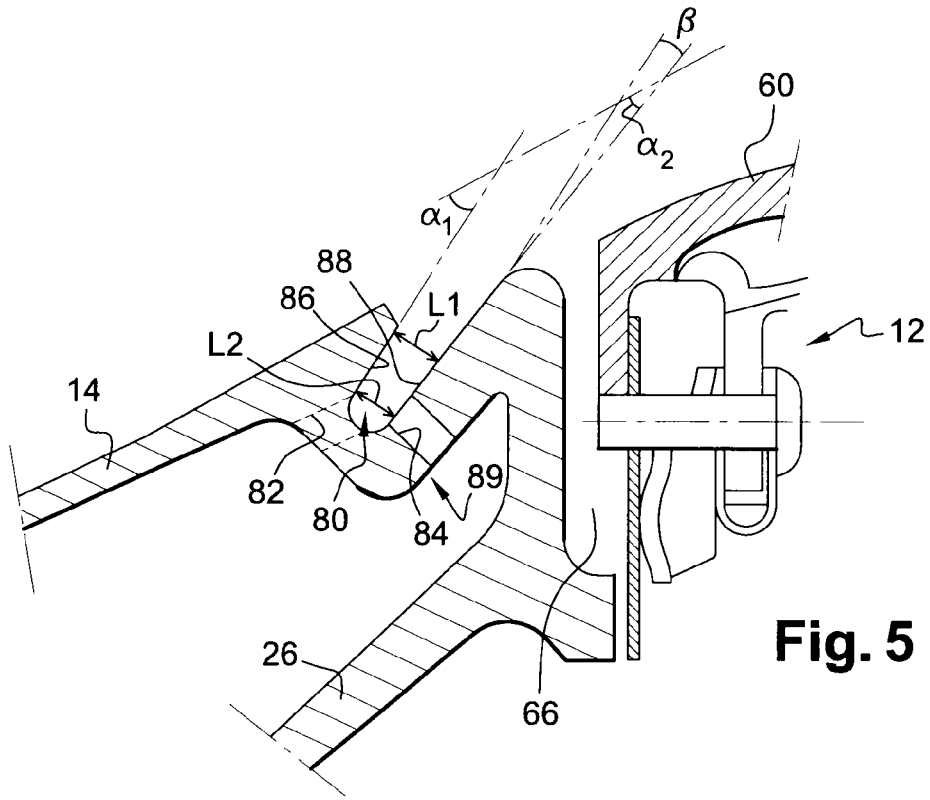
FIG. 5 is an enlarged view of the detail $I_5$ in FIG. 3.

The air films are for example formed at the downstream ends of the chamber walls 14, 16, as is the case in the embodiment depicted in FIGS. 3 to 5.

In this example embodiment, each wall 14, 16 comprises, close to its downstream fixing flange 20, 24, an annular groove 70, 80 for forming a film of air, this groove opening out at its downstream end in the chamber and being connected at its upstream end by orifices in the wall to the internal 36 and external 38 spaces respectively.

The air that passes into the internal space 36 therefore divides into a flow 42 that enters the chamber 10 through the orifices 44 and the multiperforations in the internal wall 14, a flow 71 that supplies the groove 70 in this wall, and a flow 46 that passes through the holes 48 in the internal flange 24. The air that passes into the external space 38 divides into a flow 50 that enters the chamber 10 through the orifices 44 and the multiperforations in the external wall 16, a flow 71 supplies the groove 80 in the wall 16, and flow 52 that passes through the holes 54 in the flange 20.

The groove 70 in the external wall 16, more clearly visible in FIG. 4, has a roughly frustoconical shape that extends from upstream to downstream towards the inside, this groove being inclined with respect to the downstream end part of the wall 16.

The groove 70 has in cross section a U or V shape that splays or broadens towards the downstream end. The groove 70 is delimited by two upstream 76 and downstream 78 annular surfaces that diverge one from the other towards the downstream end and are connected to each other at their upstream ends by a groove bottom with a concave rounded shape. The width of the groove therefore varies from upstream to downstream and is at a maximum at its downstream end. The width L1 of the groove at its downstream end may be greater than its width L2 close to the bottom of the groove by approximately 1 to 2 mm.

The groove 70 is supplied with cooling air by two annular rows of orifices comprising first orifices 72 that extend substantially parallel to the downstream end part of the wall 16, and second orifices 74 that are substantially perpendicular to this end part. The first and second orifices 72, 74 open out at one of their ends in the external space 38 and at their other end at the bottom of the groove. The first orifices 72 are advantageously disposed so as to be staggered with the second orifices 74. The groove 70 is for example supplied by 100 to 500 orifices 72, 74 that have a diameter of between approximately 0.5 and 2 mm. The orifices 72, 74 calibrate the flow of air supplying the groove 70, which represents approximately 1% to 2% of the air supply flow to the chamber.

The air that passes through the first orifices 72 impacts on the downstream lateral surface 78 of the groove and the air that leaves the second orifices 74 impacts on the upstream lateral surface 76 of the groove, which cools by thermal conduction the downstream end part of the external wall 16 as well as the fixing flange 20.

In a variant, the first orifices 72 are inclined by a small angle, for example between 1° and 15°, with respect to the downstream end part of the wall. The second orifices 74 can also be inclined by a small angle, between 1° and 20°, with respect to a normal to the downstream end part of the wall 16.

In the example shown, the annular groove 70 is formed in an annular protrusion 79 provided at the downstream end of the external wall 16, this protrusion being connected at its downstream end to the internal periphery of the flange 20. Preferentially, this protrusion 79 has, downstream of the groove 70, an inside diameter D1' that is slightly greater than the inside diameter D1 of this protrusion upstream of the groove, and slightly less than the inside diameter D2 of the cylinder 62 of the distributor situated downstream. The difference between D1 and D2 is around 1 to 3 mm approximately and is intended to disappear in operation by virtue of the differential thermal expansion of the external wall 16 and of the cylinder 62.

As described above, the air film formed at the downstream end of the external wall 16 cools this wall, reduces the temperature in the combustion jet over a given height or radial dimension, cools the external flange 20 by circulation of air in the annular space 66 situated between the flange 20 and the cylinder 62 of the distributor, and also cools this cylinder 62, which can then have a reduced or even zero number of multiperforations.

The groove 80 in the internal wall 14, more clearly visible in FIG. 5, has a roughly frustoconical shape that extends from upstream to downstream towards the outside, this groove being inclined with respect to the downstream end part of the wall 14 and also being splayed towards the downstream end. It is formed in an annular protrusion 89.

The groove 80 in the internal wall is similar to the groove 70 in the external wall. The description of the groove 70 above therefore also applies to the groove 80. The upstream 86 and downstream 88 annular surfaces of the groove diverge from each other towards the downstream end. The groove 80 is supplied with air by two annular rows of first and second orifices 82, 84 that open out at one of their ends in the internal space 36 and at the other end at the bottom of the groove 80.

The film of air formed at the downstream end of the internal wall 14 also cools the internal wall, the fixing flange 24 and the cylinder 60 of the distributor.

In the particular example shown in FIGS. 3 to 5, each wall of the chamber comprises a single annular groove 70, 80 for forming a film of air. In a variant, each wall of the chamber can comprise two or more of these grooves.

The invention claimed is:

1. An annular combustion chamber of a turbomachine, comprising:
   inner and outer coaxial walls of revolution extending one inside the other and delimiting therebetween the chamber, each coaxial wall comprising at least one annular groove extending around a longitudinal axis of the chamber and opening out inside the chamber, the groove being supplied with cooling air through orifices formed in said coaxial wall and opening out at a first end of said orifices in the groove and at a second end of said orifices outside the chamber,
   wherein the groove has in cross section a substantially V shape and comprises inner and outer lateral annular surfaces which diverge one from the other towards a downstream end,
   wherein the inner lateral annular surface of the outer coaxial wall groove is connected to an inner annular surface of said outer coaxial wall and extends upstream to downstream towards an inside of the chamber and is inclined with respect to said inner annular surface of said outer coaxial wall, and/or the outer lateral annular surface of the inner coaxial wall groove is connected to an outer annular surface of said inner coaxial wall and extends upstream to downstream towards the inside of the chamber and is inclined with respect to said outer annular surface of said inner coaxial wall.

2. The chamber according to claim 1, wherein the groove is formed at the downstream end of each coaxial wall of the chamber, close to an annular flange for fixing said coaxial wall to a casing of the chamber.

3. The chamber according to claim 1, wherein an angle formed between each lateral surface of the groove and an area of said coaxial wall where the groove is situated is between approximately 5° and 35°.

4. The chamber according to claim 1, wherein the lateral surfaces of the groove diverge from each other towards the downstream end by an angle of between approximately 2° and 10°.

5. The chamber according to claim 1, wherein the downstream end of the groove is wider than a base of the groove by approximately 1 to 2 mm.

6. The chamber according to claim 1, wherein the groove is supplied with cooling air by an annular row of first orifices that extend substantially parallel to an area of said coaxial wall where the groove is situated.

7. The chamber according to claim 6, wherein the groove is supplied with cooling air by an annular row of second orifices that are substantially perpendicular to the area of said coaxial wall where the groove is situated.

8. The chamber according to claim 7, wherein said first orifices are disposed so as to be staggered with said second orifices.

9. The chamber according to claim 1, wherein said orifices open out at one of their ends at the bottom of the groove.

10. The chamber according to claim 1, wherein said orifices have a diameter of between approximately 0.5 and 2 mm.

11. The chamber according to claim 1, wherein the chamber comprises between 100 and 500 orifices supplying the groove with cooling air.

12. A turbomachine comprising a combustion chamber according to claim 1.

13. The turbomachine according to claim 12, comprising a distributor mounted downstream of the combustion chamber, the distributor comprising radially inner and outer cylinders which blades extend, wherein a downstream end part of an external coaxial wall of the chamber where the groove is situated has a diameter that increases towards the downstream end and is slightly less than an inside diameter of said radially outer cylinder of the distributor.

14. The chamber according to claim 1, wherein upstream ends of the lateral surfaces of the groove are connected with each other by a groove bottom with a concave rounded shape.

* * * * *